United States Patent [19]

O'Neill

[11] Patent Number: 5,310,152

[45] Date of Patent: May 10, 1994

[54] TELEVISION MOUNTING SUPPORT WITH REMOVABLE LIFTING ASSEMBLY

[75] Inventor: Edward L. O'Neill, San Leandro, Calif.

[73] Assignee: Lucasey Manufacturing Company, Oakland, Calif.

[21] Appl. No.: 109,822

[22] Filed: Aug. 20, 1993

Related U.S. Application Data

[63] Continuation-in-part of Ser. No. 817,909, Jan. 8, 1992, Pat. No. 5,255,884.

[51] Int. Cl.⁵ .............................................. A47H 1/10
[52] U.S. Cl. ..................................... 248/329; 248/324
[58] Field of Search ............... 248/324, 326, 328, 329, 248/332, 333; 254/342, 343, 390

[56] References Cited

U.S. PATENT DOCUMENTS

| | | | |
|---|---|---|---|
| 2,553,031 | 5/1951 | Benson | 254/343 |
| 3,574,340 | 4/1971 | Busche | 248/324 X |
| 3,774,873 | 11/1973 | Krogsrud | 248/324 X |
| 3,822,051 | 7/1974 | Karapita | 248/333 |
| 3,916,967 | 11/1975 | Carlisle | 248/324 X |
| 3,981,340 | 9/1976 | Anderson | 248/324 X |
| 4,440,354 | 4/1984 | Kobayashi | 254/342 X |
| 4,964,606 | 10/1990 | Beam | 248/333 |
| 5,139,223 | 8/1992 | Sedighzadeh | 248/324 |

FOREIGN PATENT DOCUMENTS 939981 10/1963 United Kingdom ............... 248/333

*Primary Examiner*—J. Franklin Foss
*Attorney, Agent, or Firm*—Niro, Scavone, Haller & Niro

[57] ABSTRACT

The invention disclosed is a television mounting frame with a removable lifting assembly for facilitating the installation of heavy equipment, particularly large televisions. A television or the like is affixed to a lower frame yolk. An upper frame yolk, which complimentarily engages with the lower yolk to form a complete frame, is mounted to an overhead structure via a hanger pipe attached to a mounting bracket. A lifting assembly is removably affixed to the hanger pipe and disposed so that the winch cable may unwind from the winch and through the hanger pipe for attachment to the television mounted on the lower frame yolk. Once attached to the cable, the television may be lifted into engagement with the upper frame yolk without the use of large and cumbersome scaffolding systems or many assistants. The winch assembly may then be removed for use in the installation of other equipment to different mounting brackets.

9 Claims, 6 Drawing Sheets

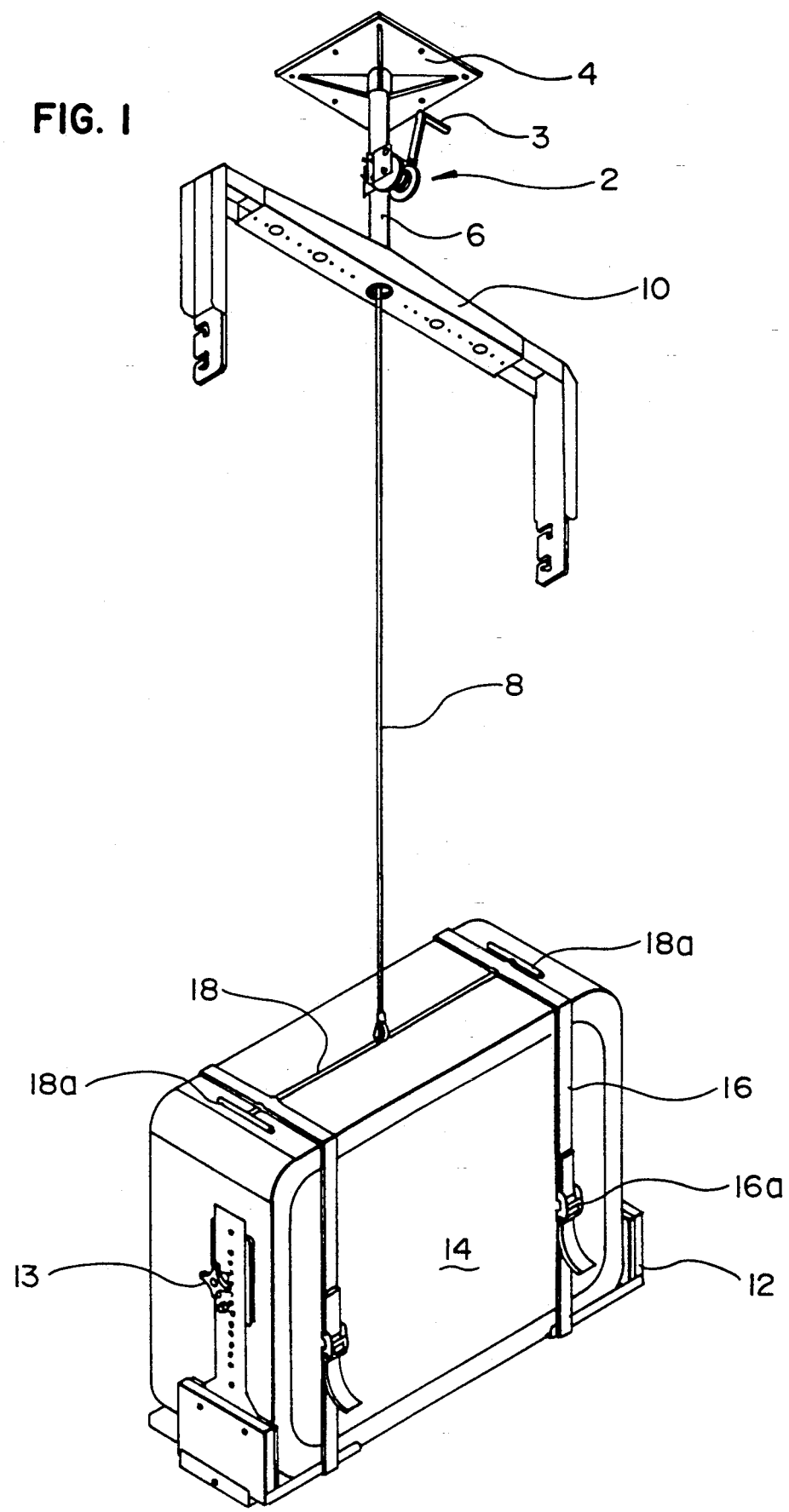

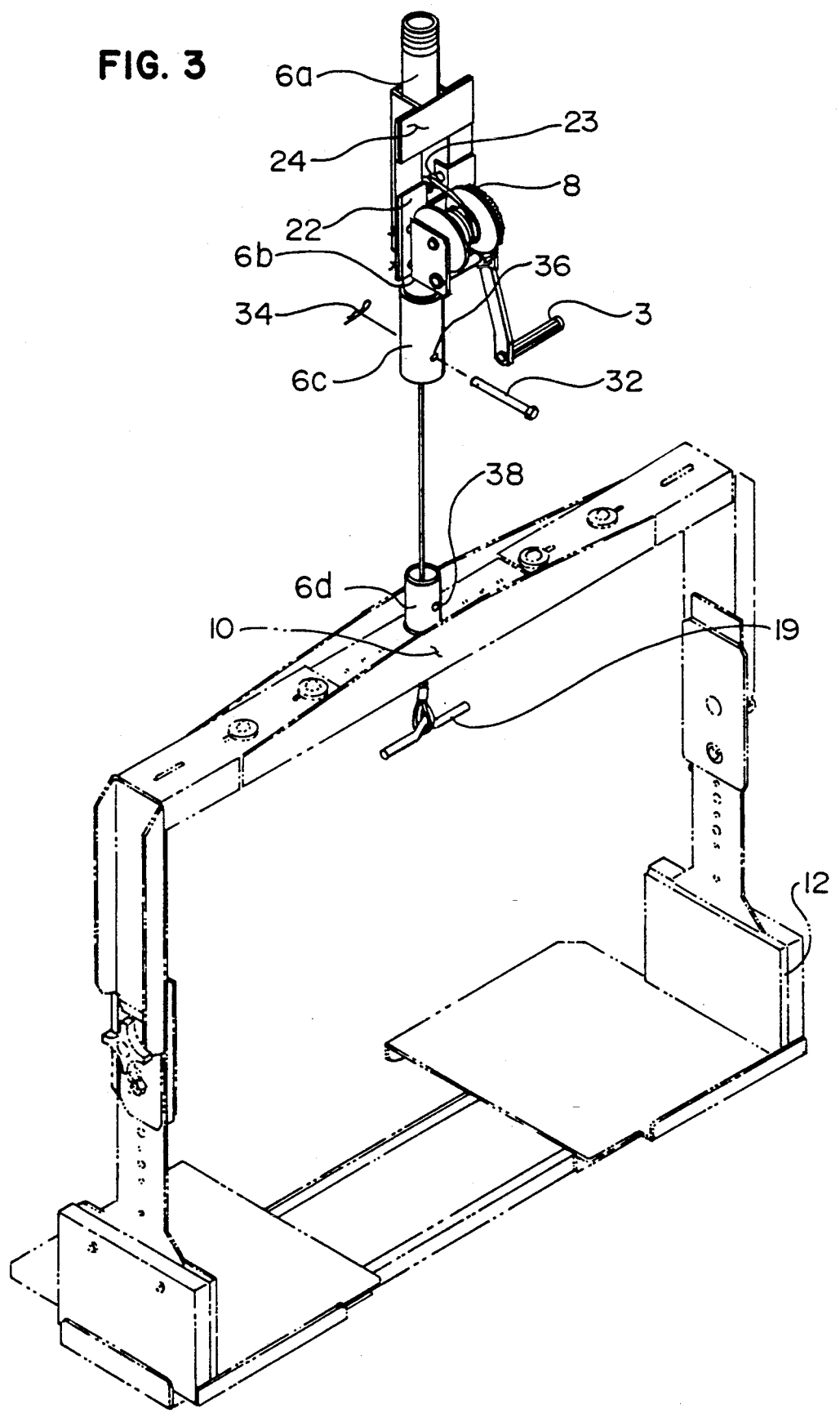

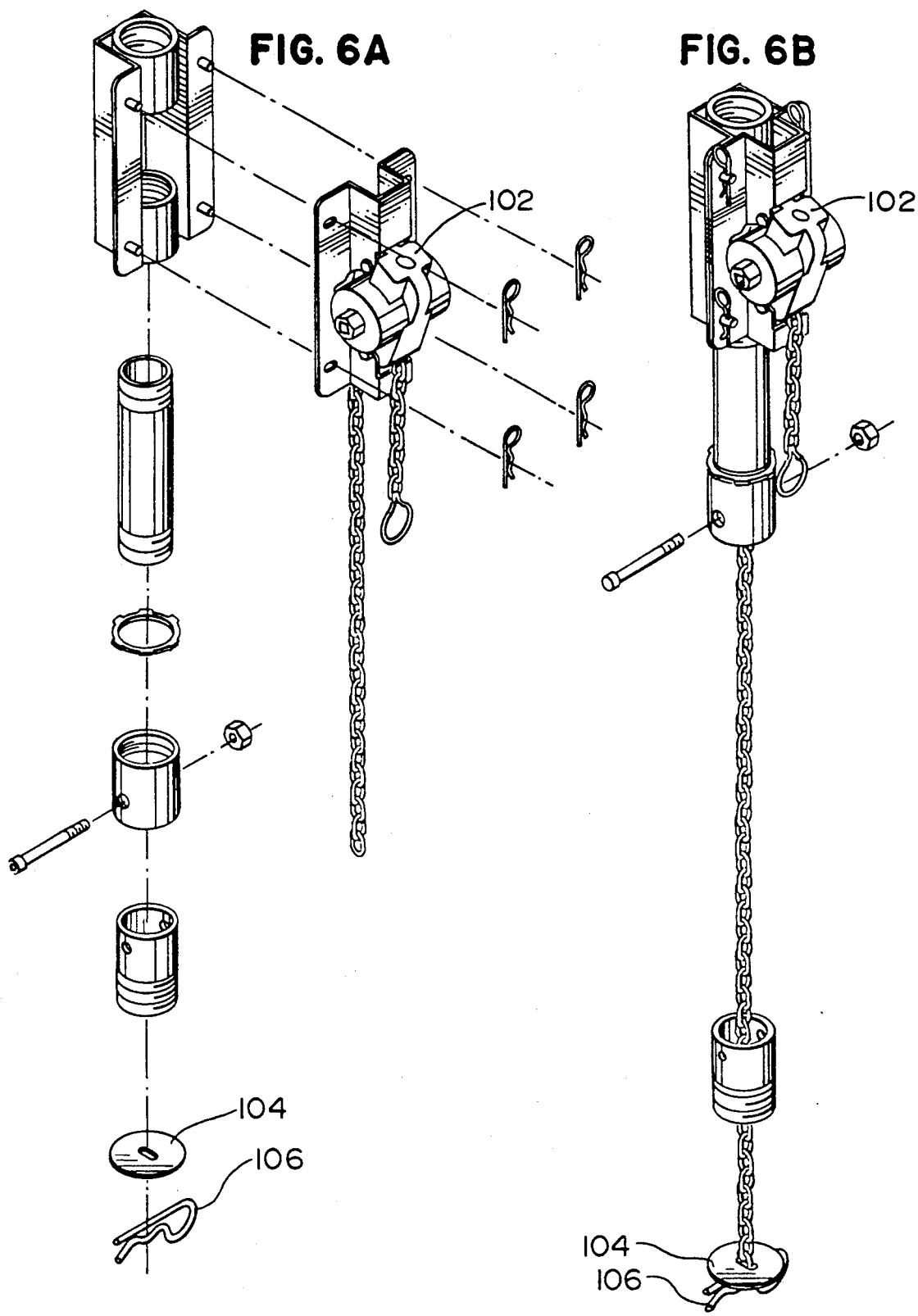

TELEVISION MOUNTING SUPPORT WITH REMOVABLE LIFTING ASSEMBLY

This is a continuation-in-part application of Ser. No. 07/817,909, Jan. 8, 1992 now U.S. Pat. No. 5,255,884.

BACKGROUND OF THE INVENTION

The present invention relates to a winch assembly that may be used to lift heavy equipment, and more specifically to a removable winch assembly that can be used for multiple installations of large televisions or like equipment.

In recent years, the use of electronic equipment has become widespread not only in the home but in the public environment. Such electronic equipment includes television sets or monitors, stereo equipment and loudspeakers. This use may be for business, such as advertising and information dissemination, for commercial purposes, such as in a retail store or exhibition hall, and for education, such as in a university lecture hall. For employment in these environments, the equipment, most often a television set or monitor, must be mounted to a ceiling in the desired location.

Inherent in every demand for a mounted equipment, especially televisions, is the consideration of feasibility of installation of that equipment. A common method of installing or mounting a television set would typically include the affixation of a mounting plate with an accompanying hanger pipe and attached upper frame yolk from the ceiling in the region of the desired location of the television. Next, a half frame yolk is affixed to the bottom of the television, secured typically by the use of clamps on the sides of the television cabinet. The television, with lower half yolk in place, is lifted up to the ceiling so that the lower yolk may be engaged with the upper yolk to complete installation.

The initial installation of the mounting plate to the ceiling and the affixation of the lower yolk to the television is quite simple and easy, however, the task of lifting the television up to the desired position on the ceiling is a much more difficult task. This is particularly true if the ceiling is very high as in a large exhibition hall or if the size of the television or piece of equipment is quite large. The ease of installation, particularly the lifting of the television into place has become a concern due to the ever increasing demand for the mounting of larger and larger televisions. Also, the demand for large numbers of television sets contributes to the need for easy installation and subsequent disassembly.

Further, the installation of a large equipment, such as large televisions (36" and larger, which can weigh in excess of 200 pounds), has required the use of many people on a ladder to lift the television into place and then install it. For example, four to five men are often needed to lift a 36" television for mounting on a ceiling. Alternatively, a scaffolding system, or a mobile scissor jack, is commonly used to lift the television up into place for installation.

These prior art methods either require the use of many people or heavy scaffolding equipment. Such a requirement is tremendously burdensome to the user of the equipment. This is particularly true considering the cost and availability of a scissor jack, or the like, and the considerable time and work power consumed by the use of many workers for the installation of television equipment. In addition, access from the floor to the ceiling can be impaired by the placement of chairs, exhibits, and the like under where the mounting may occur. Accordingly, there is a demand for a television or electronic equipment mounting system that does not require the use of many individuals to lift the television into place or the use of a scaffolding system. The present invention overcomes the foregoing disadvantages and problems encountered in previous television mounting systems.

SUMMARY OF THE INVENTION

The present invention preserves the advantages of prior art television mounting systems. In addition, it provides new advantages not found in currently available television mounting systems, and overcomes many of the disadvantage of such currently available systems.

The above objects and others, which will become apparent in the description, are achieved by providing a new and novel removable winch assembly for use in a television mounting system. The invention is generally directed to a removable winch assembly that may be detached from a television mounting system for use in another similar mounting system.

In particular, the removable winch assembly of the invention includes a manual crank winch having a spool for winding up a length of braided cable. The rear wall plate of the winch has a number holes for receiving an equal number of male fasteners, such as screws, which are attached to an interface plate. This interface plate also has a number of male fasteners that protrude from the interface plate in the opposite direction as the fasteners that engage with the holes in the rear wall plate of the winch. These fasteners engage with an equal number of holes disposed in a receiving plate member connected to a hanger pipe which is connected to a mounting plate on the ceiling. The fasteners may have holes laterally therethrough so that they may be fastened to the receiving plate member by the use of hitch pins. Accordingly, the winch assembly of the present invention may be easily removed from one hanger pipe for easy and simple attachment to another like hanger pipe arrangement.

In a preferred embodiment of the invention, the hanger pipe is divided into separate sections. The interface plate member includes a roller to direct unwinding cable of the winch through a gap in the hanger pipe sections and down through the center of the hanger pipe sections. As a result, cable exits through the hanger pipe and may be routed to the television at the ground. In another embodiment, the winch may affixed to the hanger pipe in such a fashion that the cable unwinds from the winch away and externally from the hanger pipe.

Accordingly, an object of the present invention is to provide a winch assembly which lifts television equipment, or the like, into a bracket mounting system.

Another object of the invention is to provide a winch assembly that facilitates the lifting of television equipment into a mounting system by eliminating the need for complex scaffolding systems or many workers.

A further object of the invention is to provide a winch assembly for a mounting system that is removable for use on other similar mounting systems.

Another object of the invention is to provide a hand winch assembly for decreasing the installation time of a television into a bracket mounting system.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 1 is a perspective view of one embodiment of the winch assembly of the present invention showing a lower frame yolk with television thereon being lifted up to an upper frame yolk;

FIG. 3 is a perspective view an alternative embodiment of the invention showing an entire assembled frame being lifted by the winch assembly;

FIGS. 6A and 6B depict the invention with a chain hoist for lifting the television mounting frame.

DESCRIPTION OF THE PREFERRED EMBODIMENTS

Figure 2A:
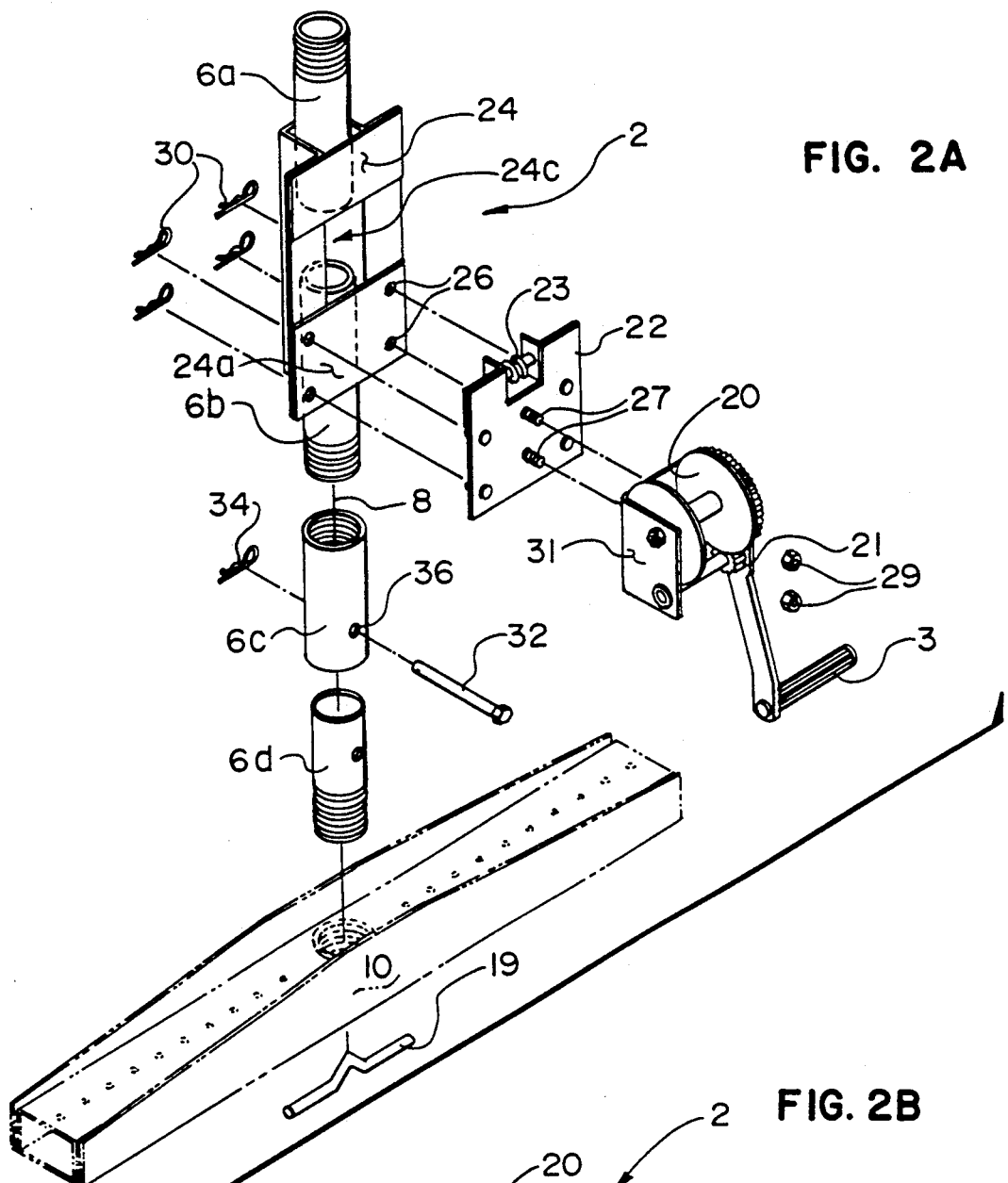
FIGS. 2A and 2B are exploded perspective views of the removable winch assembly used in the embodiment of FIG. 1.

FIG. 1 shows a perspective view of a television mounting system employing the removable winch assembly 2 of the present invention. This preferred embodiment includes mounting plate 4 affixed to a ceiling or support member (not shown) with hanger pipe 6 affixed thereon. Removable winch assembly 2 is affixed on hanger pipe 6 in such a position that cable 8 unwinds through a hole in hanger pipe 6 and out its lower end. It is preferable that cable 8 is braided steel.

Affixed onto the lower end of hanger pipe 6 is an upper frame yolk 10. This upper yolk is of a configuration to complimentarily engage with lower frame yolk 12 attached to television set 14. Lower yolk 12 may be attached to television 14 by clamp arrangement 13.

Cable 8 is lowered from removable winch assembly 2 through hanger pipe 6 for communication with rod 18. Securement rod 18 is bound to television 14 by a number of straps 16 disposed vertically about television 14. Buckles 16a ensure a snug fit of straps 16 about television 14. Rod 18 is held in place on the top surface of television 14 with the assistance of side securement members 18a. Once the television and lower yolk arrangement is secured to cable 8 via rod 18, it is ready for lifting up to upper yolk 10.

The television and lower yolk arrangement may now be lifted by the employment of the winch assembly 2 of the present invention. Cranking winch assembly 2 by handle 3 will effectuate the lifting of the television toward upper yolk 10. Once fully elevated, upper yolk 10 is fully engaged with lower yolk 12 with television 14 disposed therebetween. Upon full engagement, straps 16 are removed and rod 18 is released so that it may be detached from cable 8. Once cable 8 is free, it is completely wound onto winch assembly 2 up through and out hanger pipe. 6.

Upon completion of an installation of one television, as described above, the winch assembly 2 is completely removed from hanger pipe 6 for attachment to another like hanger pipe in a similar mounting system. Once attached to another hanger pipe, the entire process described above is repeated for the installation of the other piece of equipment.

Figure 2B:
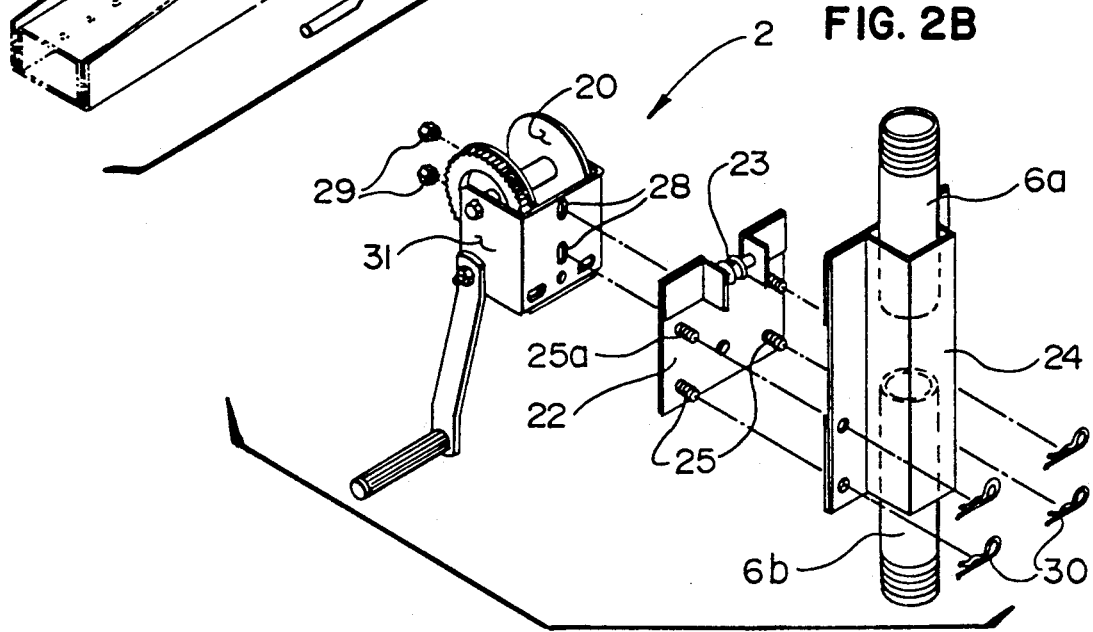

Turning to FIGS. 2A and 2B, an exploded perspective view of the preferred embodiment of winch assembly 2 of the present invention is shown. Referring to both FIGS. 2A and 2B, hanger pipe 6 is divided into four sections, 6a, 6b, 6c and 6d. Receiving plate 24 is permanently affixed to hanger pipe sections 6a and 6b. Receiving plate 24 also has aperture 24c to expose a gap between hanger pipe sections 6a and 6b. Receiving plate 24 also has a lower portion 24a which has holes 26 therethrough. It is preferable that an arrangement of four holes in a square formation be used.

Interface plate 22 has an arrangement of fasteners disposed to complimentarily engage with holes 26 on receiving plate 26. Each of the fasteners have holes 25a for receiving hitch pins once they are fully inserted through holes 26 of receiving plate 24. Accordingly, it is preferred that there are four fasteners 25 arranged in a substantially square arrangement to match up with holes 26. Interface plate 22 also includes roller 23 on its upper middle portion. When interface plate 22 is engaged with receiving plate 24, roller 23 will be situated within aperture 24c.

Winch housing 31, which carries winch spool 20, gear arrangement 21 and crank handle 3, has holes 28 for engagement with interface plate 22 via fasteners 27. Fasteners 27 are arranged to align with and penetrate holes 28. Fasteners 27 are secured to winch housing 31 by nuts 29. As a result, the interface plate 22 and winch housing 31 forms one complete unit.

The securement of winch housing 31 to interface plate 22 is considered permanent while the connection of interface plate 22 to receiving plate 24 is intended to be temporary. The use of hitch pins 30 assists in the ability to easily and quickly remove the winch housing and interface plate arrangement from the receiving plate 24. Similarly, the use of hitch pins 30 assists in the easy and simple securement of the winch housing 31 and interface arrangement to a different receiving member on another mounting system.

In the winch assembly of the present invention, the use of male fasteners for fasteners 25 and 25a and nuts 29 and hitch pins 30 are the preferred means for securing the component parts of the winch assembly together. However, other means may be employed for accomplishing the function exhibited by these parts.

For certain applications, the preferred lifting apparatus is a chain hoist 102 (FIG. 6) rather than a winch. Applicant has had particular success with a combination tool box hoist supplied by the Feeney Wire & Rope Co. The hoist has a ratchet operation with a 16 foot lift and 500 pound lifting capacity. The chain is secured to the yolk by washer 104 and pin 106.

Referring back to FIG. 1, hanger pipe 6, via sections 6a, 6b, 6c and 6d, is shown to be directly connected to upper yolk 10. Whereby, in this embodiment, the television is lifted up to upper yolk 10. Alternatively, as shown in FIG. 3, upper yolk 10 may be assembled to lower yolk 12 with television therein (not shown) before lifting up into place at hanger pipe 6. Upper sections 6a and 6b of hanger pipe 6 is shown with interface plate 22 and winch housing 31 secured thereon. Winch cable 8 is shown to ride over roller 23, into the gap between hanger pipe sections 6a and 6b, and out the lower end of hanger pipe section 6c. Middle section 6c is threadably engaged with section 6b and has hole 36, which extends through the entire circumference of the pipe, for receiving pin 32. Lower section 6d is threadably connected to the top portion of upper yolk 10. Lower section 6d also includes hole 38 which aligns with hole 36 in section 6c.

In operation, cable 8 is lowered down through section 6d of hanger pipe 6 so that rod 18 may be positioned under upper yoke 10. The entire unit, which includes upper yolk 10 and lower yolk 12, is lifted so that holes 36 in section 6c align with holes 38 in section 6d. Once the holes are aligned, pin 32 may be inserted therethrough and secured in place by hitch pin 34. When section 6c is secured to section 6d, the winch housing/interface plate arrangement may be removed for use with another mounting installation.

Figure 4:
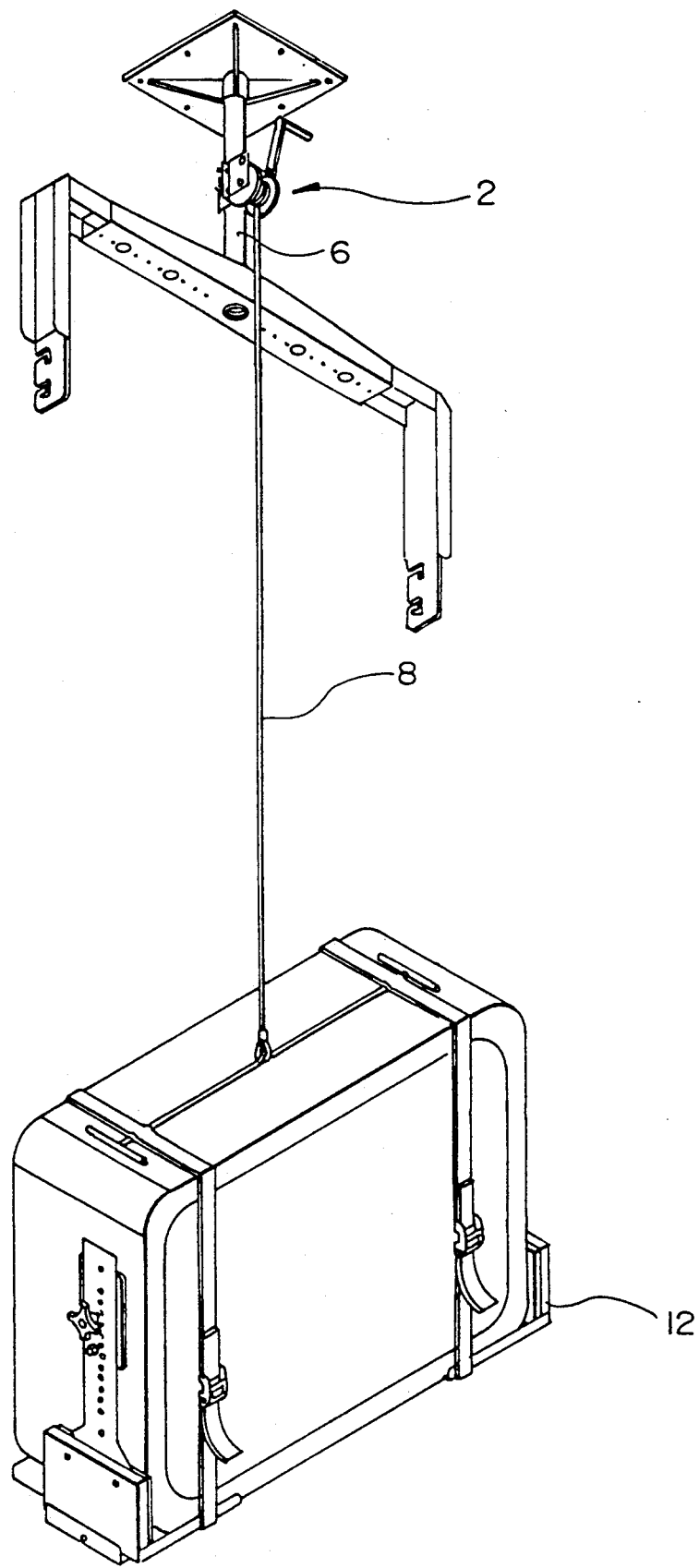
FIG. 4 is a perspective view of another embodiment of the invention showing the winch cable routed externally from the upper frame yolk.
Figure 5A:
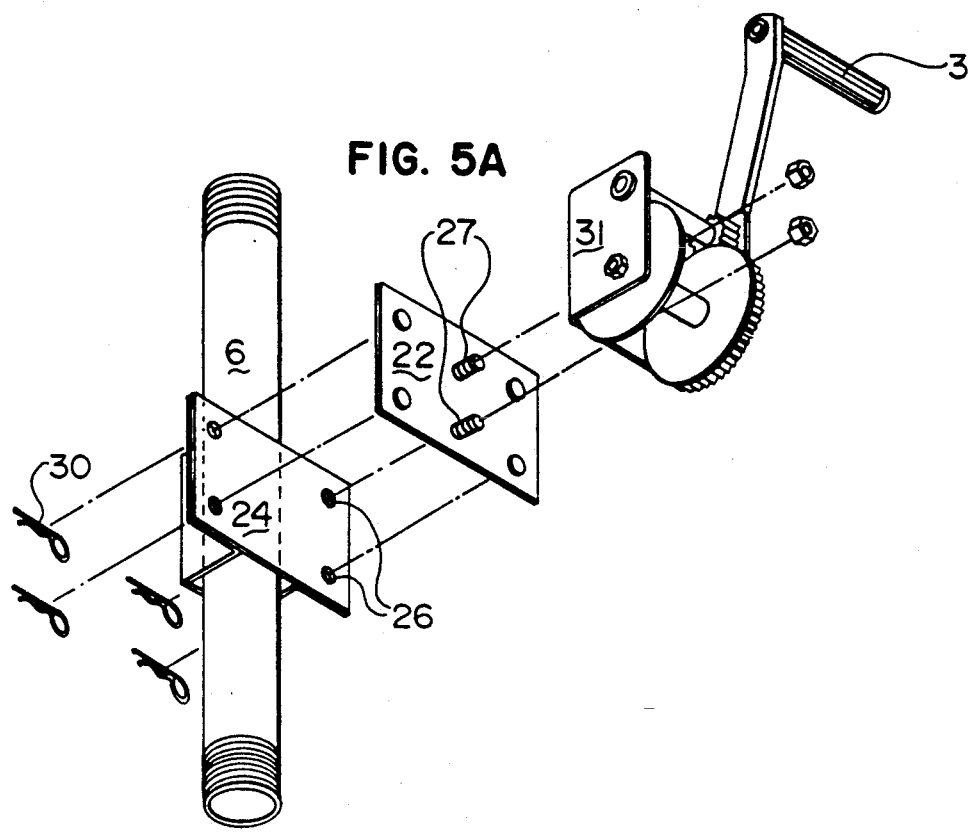
FIGS. 5A and 5B are exploded perspective views of the removable winch assembly used in the embodiment of FIG. 4.
Figure 5B:
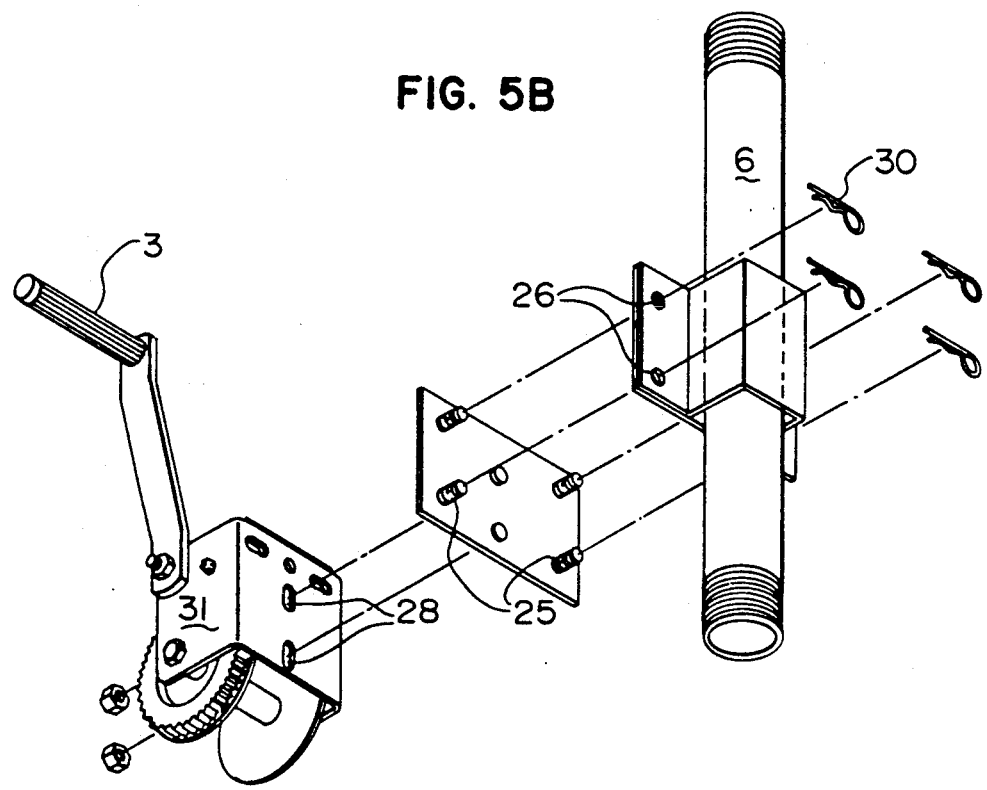

In yet another embodiment, as shown in FIG. 4, the removable winch assembly 2 is employed without routing cable 8 through the inside of hanger pipe 6. In fact, cable 8 is completely external from the upper yolk. FIGS. 5A AND 5B further illustrate this embodiment. In contrast to FIGS. 2A and 2B, receiving plate 24 does not have a gap for receiving cable 8 because, in this embodiment, hanger pipe 6 is a single, unitary member. Further, interface plate 22 does not have the roller arrangement 23 as in the in the embodiment of FIGS. 2A and 2B. These additional parts are not needed since cable 8 is routed external to the hanger pipe.

The embodiment shown in FIG. 4 is desirable when aesthetics of the ceiling area are of no concern to the user because there must be two holes, one for the hanger pipe and one for cable. This embodiment of the invention is particularly useful in large arenas where support beams are exposed, onto which mounting plate 4 is affixed. Other than the distinctions discussed above, the embodiment of FIG. 4 is substantially the same as the embodiment in FIG. 1.

Conversely, the preferred embodiment, as shown in FIG. 1, is particularly useful when ceiling appearance is of concern or there is a suspended ceiling. In this preferred embodiment, only one hole needs be to cut in the ceiling for the hanger pipe since cable 8 is routed through the inside of hanger pipe 6. In sum, a particular embodiment of the invention may be more desirable than another depending upon the intended application and physical environment in which the equipment is to be installed.

Of course, it should be understood that various changes and modifications to the preferred embodiments described herein will be apparent to those skilled in the art. Such changes and modifications can be made without departing from the spirit and scope of the present invention and without diminishing its attendant advantages. For example, lifting could be accomplished by an electric rather than manual winch or chain hoist. Also, an ornamental cover plate could be mounted to the hanger pipe once the winch or chain hoist is removed. It is, therefore, intended that all such changes and modifications be covered by the following claims.

What is claimed is:

1. An apparatus for securing equipment, comprising:
    means for supporting said equipment;
    means attached to said support means, for mounting the equipment to said support means;
    upper equipment retention means, attached to said support means, for securing the equipment;
    lower equipment retention means, attached to said upper retention means, for securing said equipment; and
    whereby said mounting means is adaptable to engage a removably attachable means for lifting the equipment.

2. The apparatus of claim 1 wherein said lifting means is a chain hoist.

3. The apparatus of claim 1 wherein said lifting means is a winch.

4. The apparatus of claim 1 wherein said support means includes a hollow portion to permit said lifting means to engage the equipment by passing through said hollow portion.

5. An assembly for mounting a television monitor or the like, comprising:
    a hollow member fixable to a supporting structure and adapted for removable attachment of a winch or chain hoist; and
    a yolk, attachable to said hollow member, for securing and mounting the television monitor, said yolk comprising an upper portion and lower portion and being adapted for lifting with the television by said winch or chain hoist into attachment with said hollow member.

6. An apparatus for lifting and mounting equipment, comprising:
    a mounting member;
    a hanger attached to said mounting member, said hanger being adapted for removable attachment of an equipment lifting device;
    an upper yolk attached to said hanger;
    a lower yolk attached to said upper yolk for securing the equipment; and
    a lifting assembly, removably attachable to said hanger, for lifting the equipment.

7. The apparatus of claim 6, wherein said lifting assembly includes a winch.

8. The apparatus of claim 6, wherein said lifting assembly includes a chain hoist.

9. The apparatus of claim 6, wherein said hanger includes a cavity.

* * * * *